Dec. 7, 1965 R. W. BRANDT, JR 3,221,567
BELT DRIVE FOR SHAKING DEVICE
Filed April 9, 1962 3 Sheets-Sheet 1
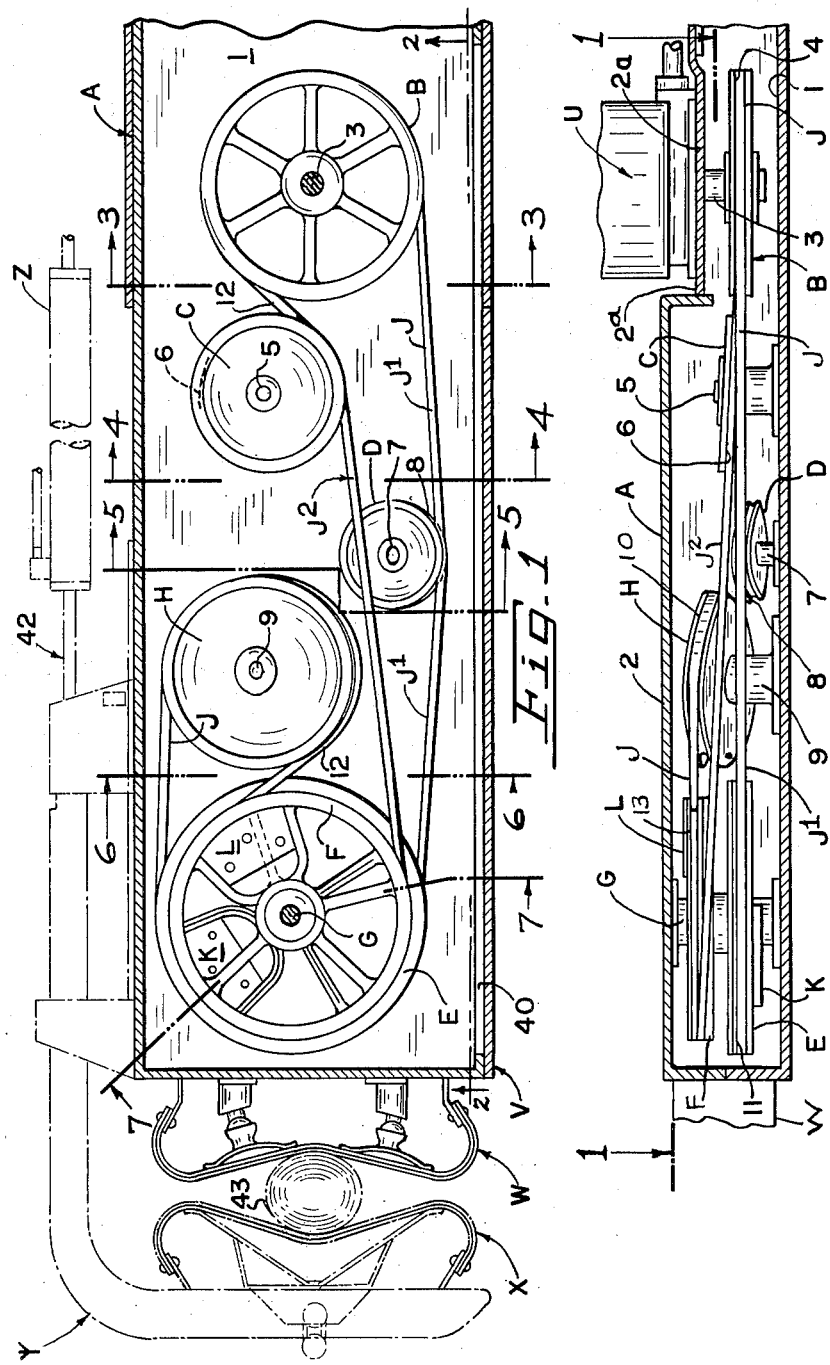
INVENTOR.
RICHARD W. BRANDT JR.
BY
ATTORNEYS Dec. 7, 1965   R. W. BRANDT, JR   3,221,567
BELT DRIVE FOR SHAKING DEVICE
Filed April 9, 1962   3 Sheets-Sheet 2
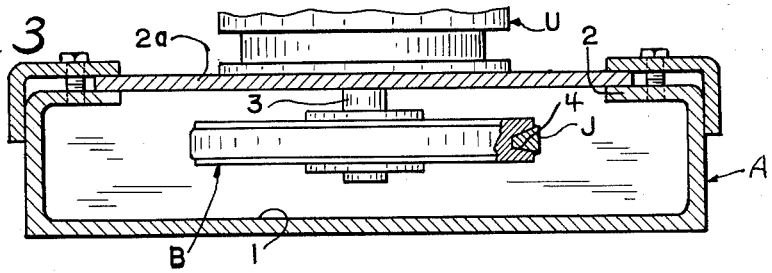
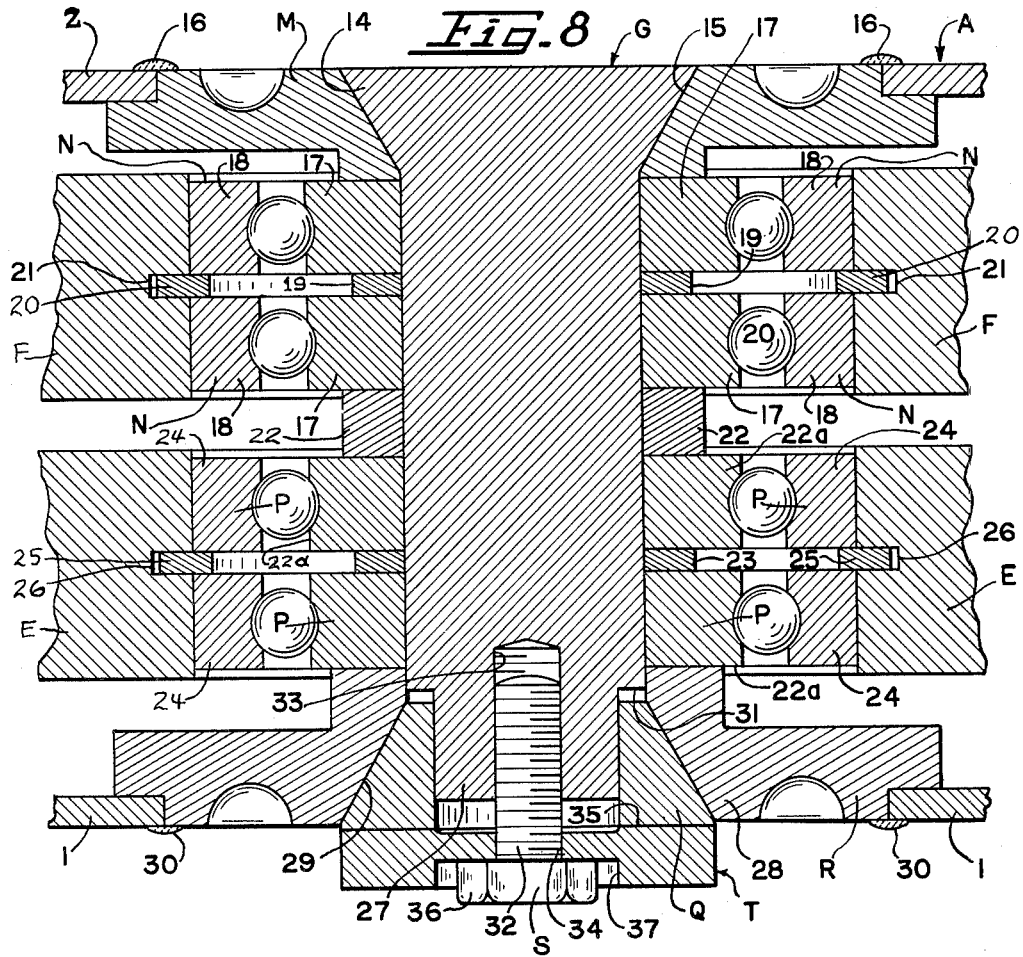
INVENTOR.
RICHARD W. BRANDT JR.
BY
Munn & Liddy
ATTORNEYS Dec. 7, 1965  R. W. BRANDT, JR  3,221,567
BELT DRIVE FOR SHAKING DEVICE
Filed April 9, 1962  3 Sheets-Sheet 3
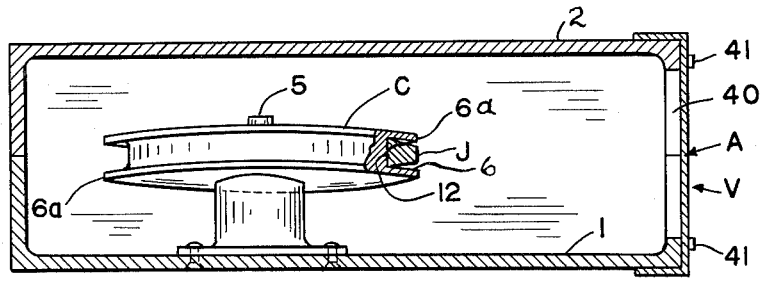
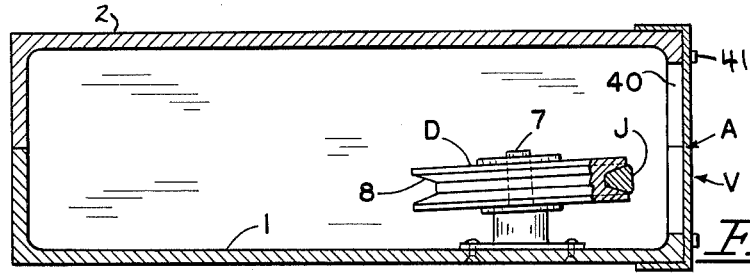
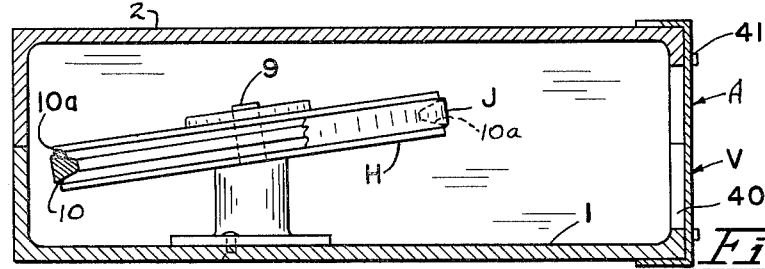
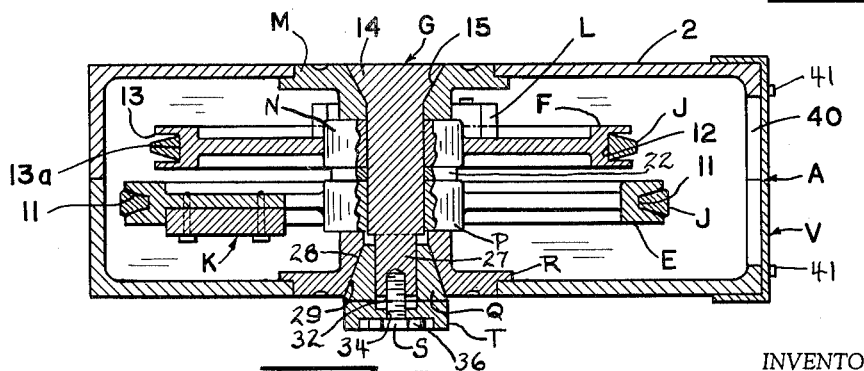
INVENTOR.
RICHARD W. BRANDT JR.
BY
Munn & Liddy
ATTORNEYS

United States Patent Office 3,221,567
Patented Dec. 7, 1965

3,221,567
BELT DRIVE FOR SHAKING DEVICE
Richard W. Brandt, Jr., P.O. Box 253, Brownsville, Calif.
Filed Apr. 9, 1962, Ser. No. 186,194
5 Claims. (Cl. 74—87)

The present invention relates to improvements in a belt drive for a shaking device and it consists in the combinations, constructions and arrangement of parts hereinafter described and claimed.

An object of my invention is to provide a belt drive for a shaking device which is compact in structure and can be mounted within a rectangular frame that is made shallow in depth and is provided with an elongated opening along one side to gain access to the V-belt. The mounting of the various pulleys and energy wheels is such that the V-belt can be removed from or applied to the pulleys and energy wheels and passed through the elongated slot without the necessity of dismantling the frame. The device may be used for shaking anything desired such as an ore classifying table or the trunk of a fruit tree or the like. The Patent Office drawings show the rectangular frame forming a part of a tree clamp with self-aligning swivel pads which is described and claimed in a copending application filed April 9, 1962, Serial No. 186,258, now U.S. Patent No. 3,163,458.

A further object of my invention is to provide a device of the type described in which two energy wheels are rotatably mounted on the same shaft that is carried by the rectangular frame and a transfer pulley is used for leading the V-belt from one energy wheel and back on to the other energy wheel for causing both energy wheels to rotate in opposite directions. Moreover one energy wheel has a V-groove in its periphery for receiving the V-shaped portion of the V-belt and the other energy wheel has a groove in its periphery with a flat bottom for receiving the flat back side of the V-belt. The transfer pulley is so placed with respect to the two energy wheels that the V-belt will engage with approximately 180° of the circumference of the energy wheel that has the V-groove therein and will engage with approximately 260° of the circumference of the energy wheel that has the groove with the flat bottom therein. In this way the V-belt will impart substantially an equal driving force to each of the two energy wheels.

Other objects and advantages will appear as the specification continues. The novel features of the invention will be set forth in the appended claims.

DRAWINGS

For a better understanding of my invention, reference should be made to the accompanying drawings, forming part of this specification, in which:

FIGURE 1 is a horizontal section through the device and is taken along the plane 1—1 of FIGURE 2, and shows the pulleys and energy wheels in top plan view;

FIGURE 2 is a longitudinal section through the device and is taken along the plane 2—2 of FIGURE 1;

FIGURE 3 is a transverse section taken along the plane 3—3 of FIGURE 1, and shows the drive pulley partly in section;

FIGURE 4 is a transverse section taken along the plane 4—4 of FIGURE 1, and shows an anti-whip pulley, partly in section;

FIGURE 5 is a transverse section taken along the plane 5—5 of FIGURE 1, and shows an anti-whip pulley, partly in section;

FIGURE 6 is a transverse section taken along the plane 6—6 of FIGURE 1, and shows a transfer idler pulley partly in section;

FIGURE 7 is a transverse section taken along the angled plane 7—7 of FIGURE 1, and shows the two energy wheels partially in section and rotatably mounted on a common shaft whose ends are secured to the top and bottom members of the frame in a novel manner; and FIGURE 8 is an enlarged sectional view through the shaft and ball bearings for rotatably supporting the two energy wheels.

While I have shown only the preferred form of my invention, it should be understood that various changes, or modifications, may be made within the scope of the annexed claims without departing from the spirit thereof.

DETAILED DESCRIPTION

In carrying out my invention I provide a rectangular casing indicated generally at A in FIGURES 1 and 2. This frame has a base plate 1 and a top plate 2. The top plate supports an adjustable bearing plate 2a that in turn carries a drive shaft 3. This shaft may be rotated by any power source such as a hydraulic motor, an electric motor, etc. FIGURE 2 shows that the lower end of the drive shaft terminates above the base plate 1 and the purpose of this will be described hereinafter. A drive pulley B is secured to the shaft 3 and FIGURE 3 shows this pulley as being provided with a V-shaped groove 4 in its periphery.

I also provide an idler pulley C and this pulley is rotatably mounted on a shaft 5 that is carried by the base plate 1. FIGURE 4 illustrates the idler pulley C as being provided with a groove 6 in its periphery and this groove has a flat bottom 6a for receiving the back side of a V-belt. The purpose of this will be described more fully hereinafter.

Again referring to FIGURE 1 it will be seen that I provide an anti-whip idler pulley D and this pulley is rotatably mounted on a shaft 7 which is carried by the base plate 1, see also FIGURE 5. The anti-whip idler pulley is provided with a V-groove 8 in its periphery and this is clearly shown in FIGURE 5.

Two energy wheels E and F are rotatably mounted on a shaft G that extends between the base plate 1 and the top plate 2. Before describing the particular and novel construction for mounting the two energy wheels E and F it is best to set forth that a transverse idler pulley H, see FIGURES 1 and 2, is rotatably mounted on a shaft 9 that in turn is carried by the base plate 1, see FIGURE 6. The transfer idler pulley H is provided with a V-groove 10 in its periphery and this groove has side walls 10a that are crowned slightly for a purpose hereinafter described. An endless V-belt J has a portion looped around the drive pulley B as shown in FIGURES 1 and 2 with the V-portion of the belt entering the V-groove 4 in the drive pulley. One reach J1 of the belt extends from the drive pulley B to the lower energy wheel E and is passed over the anti-whip idler pulley D and is received in the V-groove 8 of this pulley, see FIGURES 1, 2 and 5.

The endless belt J then extends around the lower energy wheel E in a clockwise direction when looking at FIGURE 1. The V-portion of the belt J is received in the V-groove 11 of the energy wheel E. The V-belt extends through substantially 180° of the circumference of the V-groove 11 in the energy wheel E and then the V-belt J is passed around the transfer idler pulley H in a clockwise direction when looking at FIGURE 1. The V-portion of the belt J will be received in the V-groove 10 in the transfer idler pulley H. The transfer pulley H is inclined so that there will be very little twisting of the belt portion between the energy wheel E and the transfer pulley H. The belt portion will not be angled to such an extent between the pulley H and the upper energy wheel F as to create undue friction on the sides of the belt. The slightly crowned sides 10a of the V-groove 10 in the pulley H ease any strain placed on the sides of the belt.

The V-belt is then passed around the upper energy wheel F in a counter-clockwise direction when looking at FIGURE 1 and the flat backside 12 of the V-belt will be received in the groove 13 in the upper energy wheel and will contact with the flat bottom 13a of this groove. FIGURE 1 shows the V-belt J contacting throughout approximately 260° of arc of the groove 13 in the upper energy wheel F. The inclining of the transfer pulley H is such that the belt J will not be subjected to any undue twist or angular movement as the belt moves from the transfer pulley H to the upper energy wheel F. The V-belt J has a reach J2 that extends from the upper energy wheel E back to the drive pulley B. The reach J2 of the belt will contact with the groove 6 in the idler pulley C and this groove has a flat bottom 6a for receiving the flat back side 12 of the V-belt, see FIGURE 4. It will be noted from FIGURES 1 to 5 inclusive that the various pulleys C, D and H are inclined at the proper angles for feeding the V-belt from the drive pulley B to the energy wheels E and F and back to the drive pulley. FIGURE 7 shows the lower energy wheel E provided with an eccentric weight K. The same figure shows the upper energy wheel F provided with an eccentric weight L. The weights may be of any size or shape desired and may be secured to the energy wheels in any desired manner.

It is best now to describe the particular mounting for the energy wheels E and F and this is clearly shown in FIGURE 8. The shaft G has a conical head 14 and this head is received in a conical recess 15 provided in a boss M that is welded to the top plate 2 at 16. A dual ball bearing indicated generally at N—N has its inner circular races 17 secured to the shaft G and has its outer races 18 secured to the wall of a central bore in the upper energy wheel F. The inner races 17—17 of the dual ball bearing N—N are separated from each other by a spacer ring 19. The outer races 18 of the dual ball bearing N—N are spaced from each other by a locking ring 20 and this ring is partially received in a groove 21 provided in the wall of the central bore in the upper energy wheel F. The locking ring 20 has the same width as the spacer ring 19.

A spacer ring 22 is mounted on the shaft G and is placed between the dual ball bearing N—N and another dual ball bearing P—P. This second dual ball bearing P—P is similar to the dual ball bearing N—N and is used for rotatably mounting the lower energy wheel E on the shaft G. The dual ball bearing P—P has two inner races 22a that are secured to the shaft G and are spaced from each other by a spacing ring 23. The dual ball bearing P—P also has two outer races 24 that are secured to the wall of the central bore in the lower energy wheel E and are spaced apart by a locking ring 25. The locking ring has a portion received in a groove 26 provided in the wall of the central bore in the energy wheel E. The locking ring 25 has the same width as the spacing ring 23.

The lower end of the shaft G is provided with a reduced cylindrical portion 27 that receives a split tapered collar Q. This collar has an outer conical surface 28 that is received in a conical recess 29 provided in a lower boss R. This lower boss is welded to the base plate 1 by welding 30. The split tapered collar is forced against the conical seat 29 and it is moved toward a shoulder 31 on the shaft G by a cap screw S that has its threaded shank 32 received in a threaded bore 33 provided in the reduced cylindrical portion 27 of the shaft G. The shank of the cap screw S also passes through an opening 34 provided in a keeper T. This keeper has a surface 35 that contacts with the lower end of the split tapered collar Q. The head 36 of the cap screw S is received in a recess 37 in the keeper T.

It will be seen from this construction that when the cap screw S is tightened it will move the keeper T against the split tapered collar Q and will draw the shaft G so that the conical end 14 will be held tightly in the conical recess in the boss M. At the same time the split tapered collar Q will be held tightly in the conical recess 29 in the lower boss R. The ball bearings N—N and P—P will have their inner races 17—17 and 22a—22a respectively held in compression with the spacing rings 19, 22 and 23 so that all of these parts will be rigidly held together The effective diameter of the shaft G will therefore be increased to that of the outer diameters of the inner races 17—17 and 22a—22a. Also the outer races 18—18 and 24—24 of the dual ball bearings N—N and P—P are not subjected to any side loading because the locking ring 21 has the same width as the spacer ring 19 and the locking ring 25 has the same width as the spacer ring 23. The energy wheels are spaced from each other and are also spaced from the inner surfaces of the bosses M and R. This particular structure has actually been built and operated and it can withstand the tremendously high vibratory forces created by the energy wheels E and F rotating at high speeds and in opposite directions and carrying the eccentric weights K and L. The outer surfaces of the bosses M and R are provided with annular grooves surrounding the conical seats 15 and 29 so that the heat generated for the welds 16 and 30 will not distort the conical seats.

A hydraulic motor U is shown in FIGURE 2 and this motor is mounted on the adjustable bearing plate 2a. It is possible to move the plate 2a to the right in FIGURE 2 by a means not shown for taking up any slack in the endless V-belt J. It is further possible to move the adjustable bearing plate 2a to the left in FIGURE 2 when it is desired to loosen the V-belt from the drive pulley B preparatory to removing the belt through the slot 40, provided in the casing A. The endless V-belt in being removed from the casing A is first freed from the drive pulley B, the belt being pulled downwardly from the pulley when looking at FIGURE 2. The V-belt portion from the drive pulley B will not interfere with the shaft 3 of the hydraulic motor U because the shaft terminates above the base plate 1.

The V-belt portion engaging with the groove in the transfer idler pulley H can now be freed from the pulley and moved upwardly when looking at FIGURE 2. The shaft 9 for the transfer idler pulley H has its upper end spaced below the top plate 2, see FIGURE 6, and therefore this belt portion can be moved past the shaft 9 and around the backs of the energy wheels E and F and thus be freed from all of the pulleys and the energy wheels whereupon the belt can be removed through the side slot 40. The reverse order of steps are followed when re-applying the endless V-belt to the pulleys and energy wheels illustrated in FIGURES 1 and 2.

The side slot 40 for the housing A is shown in FIGURES 4 to 7 inclusive. A side cover plate V is removably secured to the side of the casing A, see FIGURES 4 to 7 inclusive, and may be held in place by any means desired such as by cap screws 41.

The device may be used for vibrating any unit or machine desired. I have illustrated in FIGURES 1 and 2 how the housing A may support a tree clamping device and thus permit a trunk of a tree to be clamped and then vibration applied to the trunk for vibrating the tree and removing fruit therefrom. The tree clamp comprises a jaw W which is secured to the housing A and is described in my copending application, Serial No. 186,258. The tree clamp also comprises a movable jaw X and this jaw is mounted on a swingable L-shaped arm Y. The particular construction of the movable jaw X is also described in my copending application. The L-shaped arm Y is moved by a piston rod 42, see FIGURE 1, and this piston rod is actuated by a piston, not shown, that is slidably mounted in a hydraulic cylinder Z. The particular mechanism for actuating the piston rod 42 for first moving the L-shaped arm Y in a direction for moving the movable jaw X away from a tree trunk 43 and then for swinging the L-shaped arm and movable jaw X to free the tree trunk from the movable jaw is illustrated and described in my copending application and no further description need be given in this case.

Although the pitch diameter of the energy wheel E is shown slightly larger than the pitch diameter of the energy wheel F for the purpose of showing both wheels in the top plan view of FIGURE 1, it is possible to have the energy wheel F of a slightly larger diameter than the energy wheel E in actual practice. The pulleys and energy wheels are arranged in a space that is not high and therefore the housing A can be made low in height. This adapts the housing when operating a tree clamp to permit the clamp to grip the tree trunk near the ground level and to apply the vibrating force near the roots of the tree and thus do no damage to the tree.

The arrangement of the endless belt J for rotating the two energy wheels E and F in opposite directions is such that the V-belt is twisted only through an angle of about 20° as it passes from the reversing idler pulley H to the upper energy wheel F. Normally a V-belt has to be twisted through an angle of 180° if it is to rotate two wheels or pulleys in opposite directions. There is a unique angular placement of the three idler pulleys C, D, and H, so that the belt portions leaving these pulleys enter succeeding pulleys or energy wheels at the proper entry angle and changes in alignment are only taken as the belt leaves one pulley and moves to the next one. The main reversing idler pulley H has the sides 10a of the V-groove 10 crowned slightly to prevent undue friction on the belt as it enters and leaves the groove in this pulley.

The hydraulic motor U rotates the drive shaft 3 clockwise in FIGURE 1. Therefore, the drive pulley B pulls on the flat back side 12 of the endless V-belt J and this flat back side is about twice the area of the inside of the belt. The back side of the belt will have about ⅔ of the pull as does the V-side of the belt. The belt has a greater wrap around the pulley F where the back side 12 of the belt engages with the flat bottom 13a of the groove 13 than does the V-side of the belt when received in the groove 11 of the lower energy wheel E. Therefore, about the same driving power is applied to both energy wheels.

In actual practice a V-belt J about 200 inches long and ⅝ inch wide is used and the drive pulley and energy wheels are about 12 inches in diameter. The motor U develops about twenty-five horsepower, and the belt lineal speed is about 6,000 feet per minute. I do not want to be confined to these exact figures. There is not much wear on the belt because it is not overheated. The device builds up a force of about 20,000 pounds exerted by the energy wheels and this ten ton force reverses itself about 4,000 times per minute. The drive pulley B rotates about 2,000 r.p.m. and since FIGURE 1 shows the two energy wheels E and F of a slightly larger diameter, these wheels will rotate slightly less than 2,000 r.p.m. Each wheel rotation is a complete cycle of vibration and therefore there will be close to 2,000 vibrations per minute. The diameter of the energy wheel E is slightly different from the diameter of the wheel F. The type of shaking produced by the two energy wheels E and F rotating at slightly different speeds and in opposite directions is along a straight line that extends through the axis of the shaft G. The center of this straight line of shaking coincides with the shaft axis and for each back and forth shaking the straight line will stepwise rotate through a slight arc with again the shaft axis being the center of rotation. My copending case on a Mechanical Movement, Serial No. 78,347, filed December 27, 1960, explains this kind of high frequency vibration.

The shaft G and its bearings N—N and P—P are constructed to withstand these high vibratory loads. The inner races 17—17 and 22a—22a with the spacers 19, 22 and 23 provide a laminated compression construction with a tension being exerted on the shaft G. The effective diameter of the shaft is increased by the compression members. The bosses M and R have integral annular shoulders that bear against the adjacent inner races 17 and 22a to complete the laminated compression construction of the inner races and the spacers 19, 22 and 23.

I claim:
1. A device of the type described comprising:
   (a) a base;
   (b) a drive pulley rotatably carried by the base;
   (c) a first energy wheel having an eccentric mass thereon;
   (d) a shaft supported by the base and rotatably carrying the energy wheel;
   (e) a second energy wheel of a slightly different diameter than said first energy wheel and having an eccentric mass thereon; said second energy wheel being rotatably mounted on the shaft that supports the first energy wheel;
   (f) a transfer idler pulley rotatably carried by the base; and
   (g) a drive belt looped around the drive pulley so as to be driven by the rotation of the drive pulley, one portion of the belt being passed around the first energy wheel to rotate it in one direction when the belt is moved by the drive pulley;
   (h) another portion of the belt being looped around the transfer idler pulley, and another portion of the belt being passed around the second energy wheel in an opposite direction to that portion of the belt that is passed around the first energy wheel;
   (i) whereby the second energy wheel will be rotated in a direction opposite to the rotation of the first energy wheel and the eccentric masses of the two energy wheels will set up a vibratory force which will be transferred to the base by the shaft that is supported by the base.

2. A device of the type described comprising:
   (a) a base;
   (b) a drive pulley rotatably carried by the base and having a V-shaped groove in its periphery;
   (c) a first energy wheel having an eccentric mass thereon and having a V-shaped groove in its periphery;
   (d) a shaft supported by the base and rotatably carrying the energy wheel;
   (e) a second energy wheel of a slightly different diameter than said first energy wheel and having an eccentric mass thereon; said second energy wheel being rotatably mounted on the shaft that supports the first energy wheel and having a groove in its periphery with a flat bottom;
   (f) a transfer idler pulley rotatably carried by the base and having a V-shaped groove in its periphery; and
   (g) an endless drive belt V-shaped in cross section and having a portion looped around the drive pulley within the V-shaped groove in the drive pulley so that a rotation of the drive pulley will drive the V-belt;
   (h) another portion of the V-belt being passed around said first energy wheel with the V-shaped part of the belt being received in the V-shaped groove of said first energy wheel so as to rotate the wheel in one direction when the belt is driven by the drive pulley;
   (i) another portion of the V-belt being looped around the transfer idler pulley with the V-portion of the belt being received in the V-groove in said idler pulley; and
   (j) another portion of the belt being passed around the second energy wheel in an opposite direction to that portion of the belt that is passed around the first energy wheel, the flat back of the belt being received in the flat bottom of the peripheral groove in said second energy wheel;
   (k) whereby the second energy wheel will be rotated in a direction opposite to the rotation of the first energy wheel and the eccentric masses of the two energy wheels will set up a vibratory force which will be transferred to the base by the shaft that is supported by the base.

3. The combination as set forth in claim 2: and in which
(a) the drive shaft for the drive pulley has a free end that will permit the V-belt to be removed from the drive pulley; and
(b) the supporting shaft for the transfer idler pulley has a free end that will permit the V-belt to be removed from the transfer idler pulley;
(c) whereby the belt can also be removed from the two energy wheels without the necessity of removing the energy wheel supporting shaft from the base.

4. The combination as set forth in claim 2: and in which
(a) the V-shaped portion of the V-belt will encircle the V-shaped groove in the first energy wheel for about 180° of the wheel; and
(b) the flat back of the V-belt will encircle the flat groove in the second energy wheel for more than 180° of the wheel;
(c) whereby the rotating force exerted by the V-belt on both energy wheels will be approximately the same.

5. The combination as set forth in claim 2; and in which
(a) an anti-whip idler pulley is rotatably carried by the base and has a V-shaped groove in its periphery for receiving a part of the V-belt that extends between the drive pulley and the first energy wheel; and
(b) a second idler pulley is rotatably carried by the base and has a peripheral groove with a flat bottom for receiving a part of the back of the V-belt that extends between the second energy wheel and the drive pulley.

References Cited by the Examiner

UNITED STATES PATENTS

| | | | |
|---|---|---|---|
| 1,192,501 | 7/1916 | Combs | 74—87 |
| 1,280,269 | 10/1918 | Miller | 84—61 |
| 2,195,125 | 3/1940 | Smith et al. | 74—224 X |
| 2,399,503 | 4/1946 | Ott | 74—61 |
| 2,421,685 | 6/1947 | Crot et al. | 308—18 |
| 2,442,731 | 6/1948 | Paul | 74—219 X |
| 2,778,614 | 1/1957 | Koch | 74—219 X |
| 2,781,237 | 2/1957 | Masse | 308—18 |
| 2,865,210 | 12/1958 | Fisher | 74—61 |
| 2,894,405 | 7/1959 | Carle | 74—242.14 X |
| 3,040,591 | 6/1962 | Peregrine et al. | 74—61 |
| 3,076,549 | 2/1963 | Becker | 71—61 |
| 3,140,620 | 7/1964 | Ferara | 74—229 X |

FOREIGN PATENTS 1,152,412    2/1958    France.

BROUGHTON G. DURHAM, *Primary Examiner.*
MILTON KAUFMAN, *Examiner.*